United States Patent
Peurach et al.

(10) Patent No.: US 6,173,066 B1
(45) Date of Patent: Jan. 9, 2001

(54) POSE DETERMINATION AND TRACKING BY MATCHING 3D OBJECTS TO A 2D SENSOR

(75) Inventors: Thomas M. Peurach, Novi; Peggy Whalen, Woodhaven; Douglas Haanpaa, Ann Arbor; Mike Whalen, Woodhaven; Charles J. Jacobus, Ann Arbor, all of MI (US)

(73) Assignee: Cybernet Systems Corporation, Ann Arbor, MI (US)

( * ) Notice: Under 35 U.S.C. 154(b), the term of this patent shall be extended for 0 days.

(21) Appl. No.: 08/861,411

(22) Filed: May 21, 1997

(Under 37 CFR 1.47)

Related U.S. Application Data

(60) Provisional application No. 60/018,038, filed on May 21, 1996.

(51) Int. Cl.$^7$ .................................................. G06K 9/00
(52) U.S. Cl. ..................... 382/103; 382/154; 382/291; 348/169
(58) Field of Search ................................. 382/103, 153, 382/154, 209, 291; 348/169, 170; 356/394

(56) References Cited

U.S. PATENT DOCUMENTS

| | | |
|---|---|---|
| 4,402,053 | 8/1983 | Kelley et al. . |
| 4,473,883 | 9/1984 | Yoshida et al. . |
| 4,644,585 | 2/1987 | Crimmins et al. . |
| 4,654,872 | 3/1987 | Hisano et al. . |
| 4,707,647 | 11/1987 | Coldren et al. . |
| 4,712,248 | 12/1987 | Hongo . |
| 4,845,765 | 7/1989 | Juvin et al. . |
| 4,876,728 | 10/1989 | Roth . |
| 4,982,438 | 1/1991 | Usami et al. . |
| 5,040,231 | 8/1991 | Terzian . |
| 5,173,946 | 12/1992 | Rao . |
| 5,220,615 | 6/1993 | Ishii et al. . |
| 5,249,035 | 9/1993 | Yamanaka . |
| 5,263,098 | 11/1993 | Horikami . |
| 5,351,310 | 9/1994 | Califano et al. . |
| 5,422,962 | 6/1995 | Yasukawa et al. . |
| 5,809,171 | * 9/1998 | Neff et al. ............................. 382/209 |

OTHER PUBLICATIONS

Bolles et al., "A Complete and Scalable Architecture for 3D Model–Based Vision", Proceedings, 5th IEEE International Symposium on Intelligent Control 1990, vol. 1, Sep. 5–7, 1990, pp. 212–219.

Califano et al., "Generalized Shape Autocorrelation", AAAI–90, Proceedings Eighth National Conference on Artificial Intelligence, vol. 2, Jul. 29–Aug. 3, 1990, pp. 1067–1073.

Bolles et al., "Recognizing and Locating Partically Visible Objects: The Local–Feature–Focus Method," Int'l. J. of Robotics Research, vol. 1, No. 3, pp. 57–82.

Y. Lamdan and H. J. Wolfson, "Geometric Hashing: A General and Efficient Model–Based Recognition Scheme,"

(List continued on next page.)

*Primary Examiner*—Amelia Au
*Assistant Examiner*—Vikkram Bali
(74) *Attorney, Agent, or Firm*—Gifford, Krass, Groh, Sprinkle, Anderson & Citkowski, PC

(57) ABSTRACT

An improved method of pose determination and tracking does away with conventional segmentation while taking advantage of multi-degree-of-freedom numerical fitting or match filtering as opposed to a syntactic segment or feature oriented combinatorial match. The technique may be used to improve image database query based on object shape descriptors by allowing the user to request images from a database or video sequence which contain a key object described by a geometric description that the user designates or supplies. The approach is also applicable to target or object acquisition and tracking based on the matching of one or a set of object shape data structures.

8 Claims, 15 Drawing Sheets

OTHER PUBLICATIONS

Proc. of the IEEE Second Int'l. Conf. on Computer Vision, pp. 238–249, Tampa, Florida, Dec., 1988.

Freeman, "Computer Processing of Line–Drawing Images", Computing Surveys, vol. 6, No. 1, Mar. 1974, pp. 77–85.

Bolles, "Robust Feature Matching Through Maximal Cliques", Proc. of SPIE, Apr. 1979.

Perkins, "Model–Based Vision System for Scenes Containing Multiple Parts", G. M. Research Pub., pp. 1–16, 6–77.

Perkins, "Multilevel Vision Recognition System," IEEE Proc. of Int'l. Joint Conf. on Pattern Recognition, pp. 739–744.

Segen, "Locating Randomly Oriented Objects from Partial View," Proc. of SPIE, vol. 449, 1983, pp. 676–684.

Stimets et al., "Rapid Recognition of Object Outlines in Reduced Resolution Images", Pattern Recognition, vol. 19, No. 1, 1986, pp. 21–32.

Holland et al., "Consight–1: A Vision–Controlled Robot System for Transferring Parts from Belt Conveyors", Computer Vision & S B Robots, 1979, pp. 81–97.

\* cited by examiner

Apply the following two masks to a 3 x 3 local pixel array on the image to compute $\nabla_x$ and $\nabla_y$.

| -1 | 0 | 1 |
|----|---|---|
| -2 | 0 | 2 |
| -1 | 0 | 1 |

| -1 | -2 | -1 |
|----|----|----|
| 0  | 0  | 0  |
| 1  | 2  | 1  |

Then compute angle and magnitude using:

$$\alpha = \text{Tan}^{-1} \nabla_y / \nabla_x \qquad \nabla = \sqrt{(\nabla_x^2 + \nabla_y^2)}$$

(Object
    (Surface
        (edge $V_1$ $V_2$)
        (edge $V_2$ $V_3$)
        (edge $V_3$ $V_1$)
    )
    (Surface
        (edge $V_1$ $V_3$)
        (edge $V_3$ $V_4$)
        (edge $V_4$ $V_1$)
    )
    Surface
        (edge $V_1$ $V_4$)
        (edge $V_4$ $V_2$)
        (edge $V_2$ $V_1$)
    )
    Surface
        (edge $V_3$ $V_4$)
        (edge $V_4$ $V_2$)
        (edge $V_2$ $V_3$)
)

Where:
    $V_1 = (X_1, Y_1, Z_1)$
    $V_2 = (X_2, Y_2, Z_2)$
    $V_3 = (X_3, Y_3, Z_3)$
    $V_4 = (X_4, Y_4, Z_4)$

POSE DETERMINATION AND TRACKING BY MATCHING 3D OBJECTS TO A 2D SENSOR

REFERENCE TO RELATED APPLICATION

This application claims priority of U.S. provisional application Ser. No. 60/018,038, filed May 21, 1996, the entire contents of which are incorporated herein by reference.

FIELD OF THE INVENTION

This invention relates generally to computer vision and automated shape recognition and, more particularly, to improved methods of pose determination and tracking.

BACKGROUND OF THE INVENTION

A great deal of interest in computer vision and automated shape recognition has been expressed over the last 40 years. Potential applications of this technology include automated recognition of targets in target acquisition systems, part identification and position/orientation acquisition to control flexible automation, vehicle tracking for automated highway functions, and, most recently, via automated query into large image and video databases.

The tracking of a known object and/or presence/absence determination within a constrained context (for instance at a particular station of an automated machine), can be accomplished through a number of special case approaches. Most practical industrial machine vision and target tracking systems are based on one of more of these techniques. However, truly flexible object identification requires recognition of detailed object shape as a necessary step towards other applications such as tracking and/or location determination.

Virtually all prior methods for object recognition in images follow the process flow shown in FIG. 1, which consists of:

1. Image Acquisition: the process of capturing one or more digital images from one or more sensor sources (for instance a CCD camera or infrared camera), as single-frame or multiple-frame video sequences.

2. Feature extraction and segmentation: a process performed on each image which includes:

removal of useless variation (like variation in scene lighting due to illumination differences or noise filtering to remove maxima and minima generated by sensor imperfections);

feature enhancement to accentuate information bearing variation (for instance, edge detection using any of a number of alternative techniques); and feature segmentation to group meaningful feature components together (for instance, tracing probable lines by following high-contrast edge sequences)

3. Object matching (assembly of feature segments into object hypotheses): a process which assembles segmented features into groupings which correspond to objects of interest.

4. Object verification: because the object groupings or matches are sometimes faulty, most systems have independent algorithms which check additional image or feature information to verify that object groupings hypothezised are most likely correct. In many systems, if an object match is deemed incorrect, alternative matches can be solicited from the matching process.

5. Computation of object properties: after a plausible object matching is proposed and tested, additional information can be acquired from the match, the image (referenced by the object location, boundaries, etc.), or surrounding areas. For instance, (see FIG. 2) if four points (i.e. features) are matched from the object to an object model, the rotation and translation of the model so that it precisely matches the view in the image can be computed.

For three-dimensional object recognition within a two-dimensional medium like a photo or video frame, FIG. 2 shows how the general framework of FIG. 1 is elaborated. A typical approach to feature extraction and segmentation is to first process the image through an edge detection algorithm which yields an image which has high (or low) value cells corresponding to where the original input image has rapidly changing values (i.e., where two surfaces with differing reflectance due to surface characteristics variation or differing surface tangent angles) and value near to zero where values vary slowly or not at all (i.e., where surface tangent angles and surface characteristics are relatively constant indication a homogenous surface). Then a segmentation process follows edge tracks to connect sequences of edges which share properties (like pointing direction) into longer curves or lines. These line features are then used for subsequent matching. Many edge detection methods exist, but a typical one used is the Sobel edge detector (FIG. 3), which provides hi as its output an edge strength value, $\nabla$, and an edge direction value, $\alpha$.

The typical matching and verification process is more variable, and is subject to substantial current research and development. However, most approaches exploit the notion that if four point correspondences can be correctly made between a three-dimensional object model (which can be represented as three-dimensional vertex points connected by three edges and optionally grouped into surfaces—FIG. 4) and corresponding feature segments from an image, a full rotational/translational transform can be computed which specifies how to take the model into the view seen in the image (or the inverse of taking the image and transforming it to object model coordinates). Determining this transform is tantamount to determining the position and location of the object in the image assuming that the location and pointing direction of the acquisition camera is known. As shown in FIG. 5, because the object location and orientation are known from this process relative to the camera centered coordinate system, to transform into world coordinates, the camera center location and orientation must be known.

There are two problems with this conventional approach to object recognition and orientation extraction. The first major shortcoming is in feature extract and segmentation. Extract is by itself a simple feature enhancement technique which performs a local matched filter to extract or accentuate a specific signal. Any such signal matching method will have characterizable signal-to-noise ratios and false alarm probabilities (i.e. probabilities that a signal will be detected when one does not exist, which is referred to as a false positive, and probabilities that a signal is present when one is not detected, which is referred to as a false negative). For simplicity, if both of these errors are lumped together as $P_e$, the probability of error, then a simple segmentation process, or a process of bottom-up grouping, will generate features with errors having a probability of $P_e^n$, where n is the average number of signals grouped into the feature. It is clear that any segmentation process is only as good as its input features, and that segment error goes up rapidly with size. Assuming a signal detection of 0.95, which is correct 19 out of 20 times, a segment made of only 10 subsignals will have an error probability of 0.56 or only a little better than ½ the time.

The second problem is that the process of matching feature segments to models, especially for variable orientation three dimensional forms, is very combinatorially challenging. Recall that a three-dimensional object changes how its looks in a two-dimensional perspective quite a bit depending on object orientation, range, and position. Thus, the process of getting the required four-point match, which then allows orientation and position transforms to be computed, involves performing a matching process such as one of the following:

1. Examine each model vertex point to image line intersection (or image vertex) taken four at a time.
2. Examine each model edge (which has two end points) to image line segment (which also has two end points) take two at a time.
3. Examine each model three dimensional line to image line taken three non-coplanar lines at a time (this method allows for edge end points which are covered by other objects in the image—this covering is called occlusion).

Each of these methods is comparably combinatorially challenging. As an example, consider number 1 above. If a typical image scene generates between 100 and 200 surfaces and therefore nominally 300–400 segments and vertices, assuming most segments form closed boundaries and therefore vertex count and segment count will be similar, and a trihedral model like that shown in FIG. 4 (with four vertices) is to be matched, the computational effort expended will be (4*300+3*299+2*298+297)*k, or 2990 k, where k is the level of effort per match. Imaging a more realistic object like an automobile which would take in excess of 600 edges to represent even reasonably well. In this case computational effort would be 714614 k. Clearly, the matching process can quickly go beyond what is reasonable to compute. That is because when matching is posed as a combinatorial problem, it is NP (non-deterministic polynomial) hard.

SUMMARY OF THE INVENTION

The present invention provides methods which substantially eliminate many of the prior-art problems just described. Broadly and in general terms, the invention does away with conventional segmentation, and process of matching of a model to the image relies upon a six-degree-of-freedom numerical fitting or match filtering as opposed to a syntactic segment or feature oriented combinatorial match. The inventive approach is applicable to several areas of interest, including target or object acquisition and tracking based on the matching of one or a set of object shape data structures, as well as the acquisition and tracking of missiles, automation systems, spacecraft tracking/docking, and vehicle identification. The methods may also be used to improve image database query based on object shape descriptors by allowing the user to request images from a database or video sequence which contain a key object described by a geometric description that the user designates or supplies.

DETAILED DESCRIPTION OF THE PREFERRED EMBODIMENT

This invention is based in part on the realization that conventional segmentation can be eliminated, and that the process of matching of a model to the image should take the form of a six-degree-of-freedom numerical fitting or match filtering as opposed to a syntactic segment or feature oriented combinatorial match (wherein specific image features are associated with model features or elements in all or most combinations).

In its purest form, however, the inventive approach is also impractical. In particular, the most primitive data item in an image is the pixel, and there are typically in excess of 256,000 pixels in a standard digitized video image (512×512 or larger), and interesting structural properties of objects typically are observable only by examining groups of pixels together.

The computation effort of a pure six degree of freedom matched filter is also very large. Consider six degrees of freedom, each of the three linear dimension being divided in to 1000 distinct steps, and the three angular dimensions being divided in 2 degree increments; the computational effort for an exhaustive match is 1000*1000*1000*180*180*180, or $5 \times 10^{15}$. However, through judicious approximation, the invention can closely simulate the elimination of segmentation and matching through the six degree of freedom matched filter approach.

Figure 6:
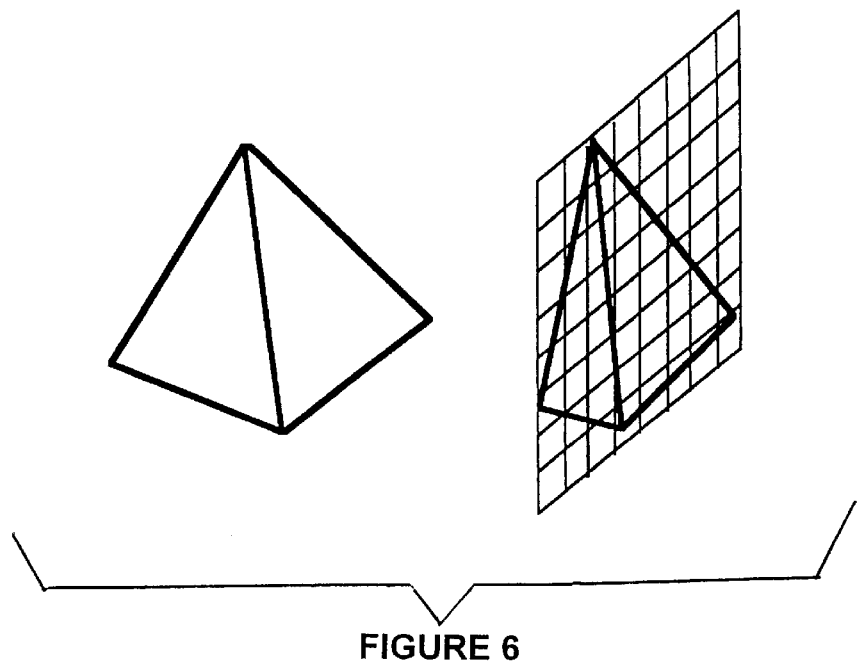
FIG. 6 shows how an object may be zoned into a matrix of 8×8 feature zones.

Begin by considering what is actually important in an object signature in a digital image. It is generally agreed that the most significant features for shape discrimination are edge segments located at surface-to-surface interfaces, and that the most reliable of these occur at occluding edges where an object is in front of a background or other objects. Edges which have short length have a higher probability of being noise and not part of a significant boundary, however, longer edges seem more likely to be part of an object boundary. Study by the present inventors has shown that the typical geometric shape can be discriminated when the space the object takes up is subdivided into nominally 8×8 to 16×16 discrete feature zones. Referring to FIG. 6, more of these zones tend to add complexity, while fewer lose too much of the object's inherent geometry.

Figure 8:
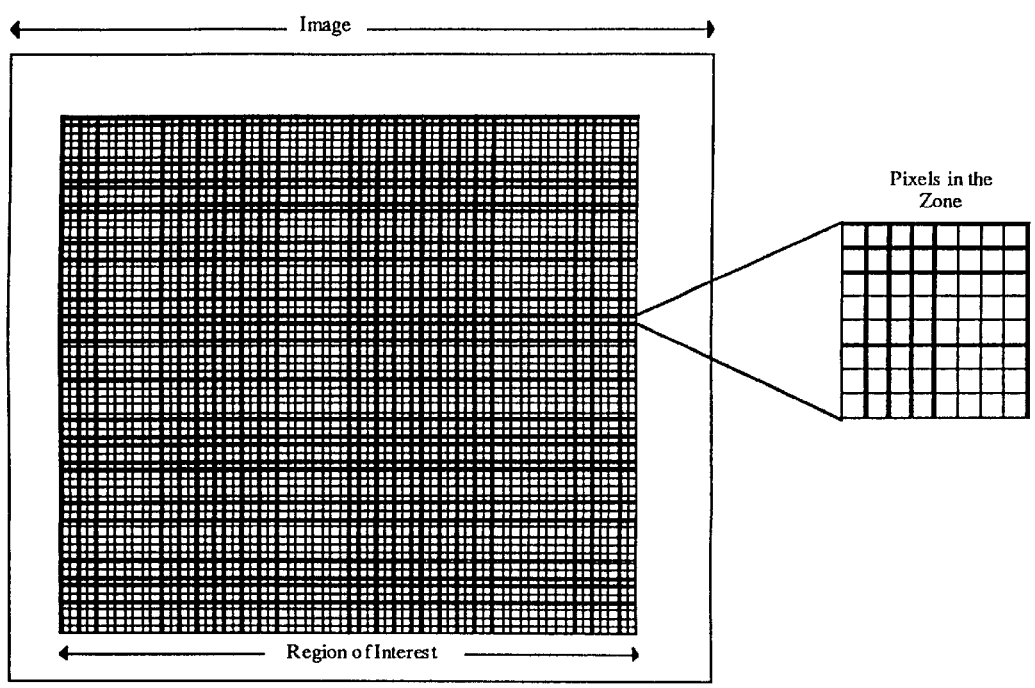
FIG. 8 illustrates the process of zoning within a region of interest.
Figure 7:
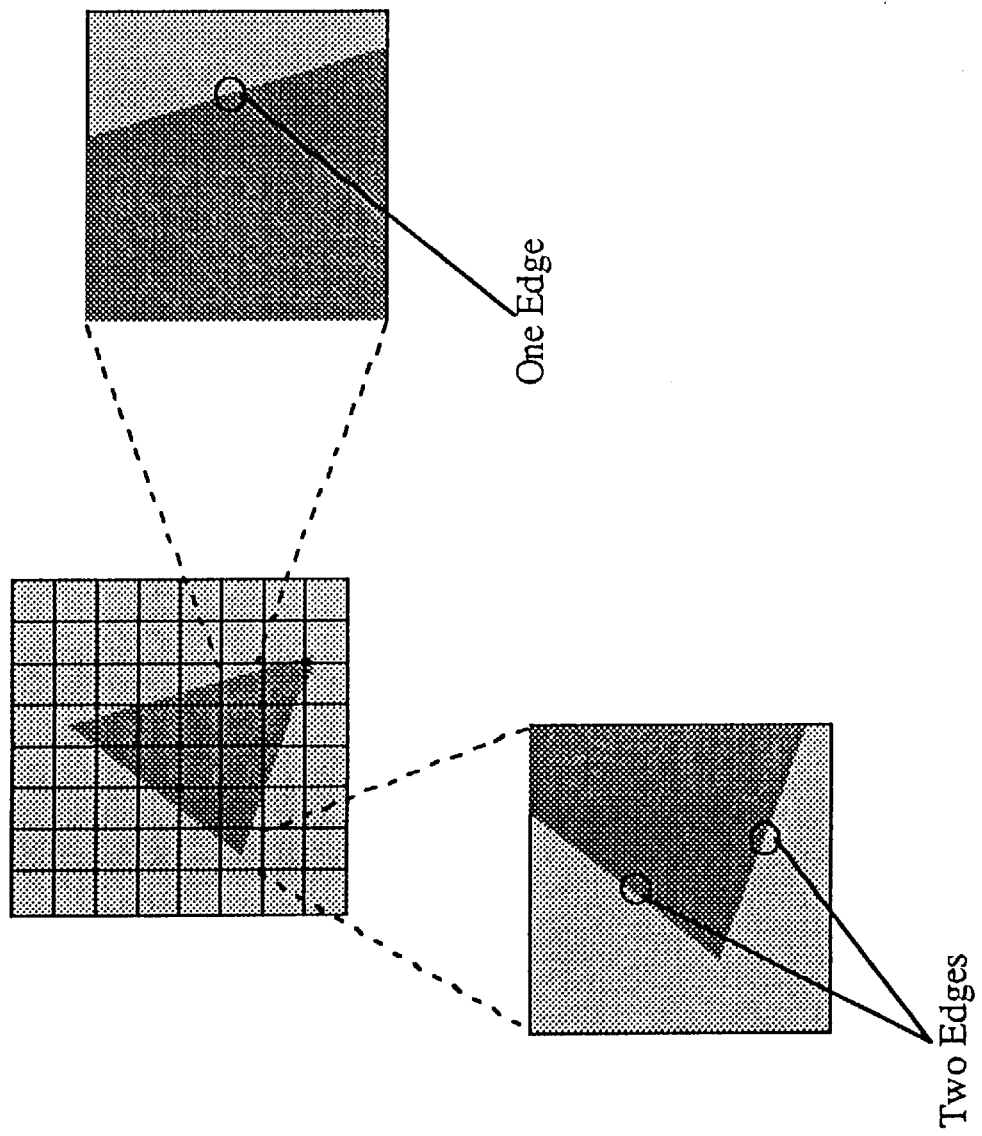
FIG. 7 is a diagram which illustrates multiple and single events within a zone.

Within each zone, many different signals may be superimposed, for instance, multiple surfaces may join in the zone as shown in FIG. 7. The simplest assumption is that there is a single, simple event in each zone, and, if this is assumed, most, but not necessary all, of the zones can be interpreted correctly. Thus, chopping the region of interest in an input image into a number of multiple pixel zones or grids (as shown in FIG. 8), which cover an object signature with 8×8 or more distinct zones is where the method of this invention begins. The maximum distinct features generated from the image is set by this range of grid size. For instance, assuming a 512×512 pixel image and an object of 64×64 pixels in size, the image would typically be subdivided into 8×8 pixel sized grids, providing 64 over the object and 4096 over the entire image. Rather than refer to this approach as segmentation, which implies aggregation based on some meaning-finding heuristic, it will be referred to herein as zoning, which may be further defined as an arbitrary division of an area or space into discrete components based on the level of complexity required to represent or capture a phenomenon while maintaining reduced complexity.

This zone concept is analogous to what designers of circuit-board routers do to keep automated routing within acceptable complexity. The routing problem (i.e., the finding of sets of connections which minimize connection length but provide full desired interconnection) is equivalent to the well known NP hard traveling salesman problem. However, by chopping the circuit board area in to cells sized at the smallest feature size supported by the fabrication technology, the problem is converted from NP hard to $N^2$, and still yields acceptable results. Zone application is a recurring method applicable to the problem of shape processing and, as indicated below, may be applied to other steps as well.

Figure 9:
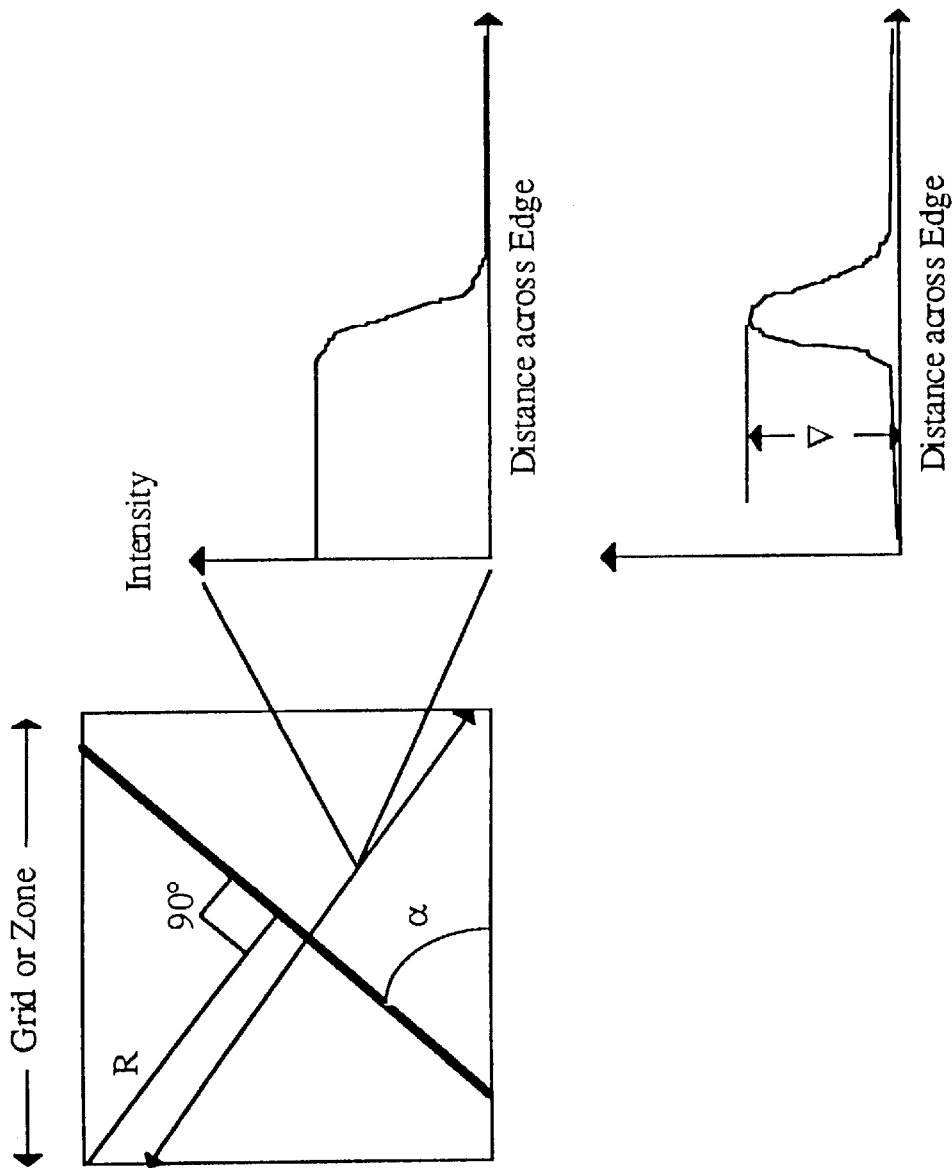
FIG. 9 is a drawing which depicts a way in which edge data may be utilized by the invention.

This disclosure has alluded to the fact that the primitive feature extracted from the grid is an edge (FIG. 7). The notion of assuming a single perceptual event within the grid does not preclude alternative features, however. It has been suggested in the literature that edges carry the majority of geometrical information in human vision. According to this invention, examination of each grid area may be used to extract the following information (FIG. 9):

1. Edge presence or absence (perhaps a probability of presence); and

2. The location and orientation of the edge that is present.

In one embodiment (which is by no means the only approach), a Sobel operator is evaluated at each pixel within the grid. The Sobel generates an edge strength, $\nabla$, a location, $X_p$, $Y_p$ (because it is evaluated at each pixel location), and a direction angle, $\alpha$. The location ($X_p$, $Y_p$) and the angle $\alpha$ can be converted into an R and an $\alpha$ according to the relation.

$$(Y-Y_p)/(X-X_p)=\tan \alpha \rightarrow R=X \sin \alpha + Y \cos \alpha$$

These two parameters are then used as indices into a two-dimensional R-$\alpha$ array to select a cell into which the edge strength, $\nabla$, is summed. After all of the pixels in the grid have been evaluated, the R-$\alpha$ array is scanned for a maximum value. If this value is greater than a significance threshold, the grid is deemed to have an edge element in it at the R-$\alpha$ location. Thus, each grid either has a feature in it or not, and if it does, its location and orientation are known. This aspect of the invention is analogous to the Hough transform line-finding method.

Figure 1:
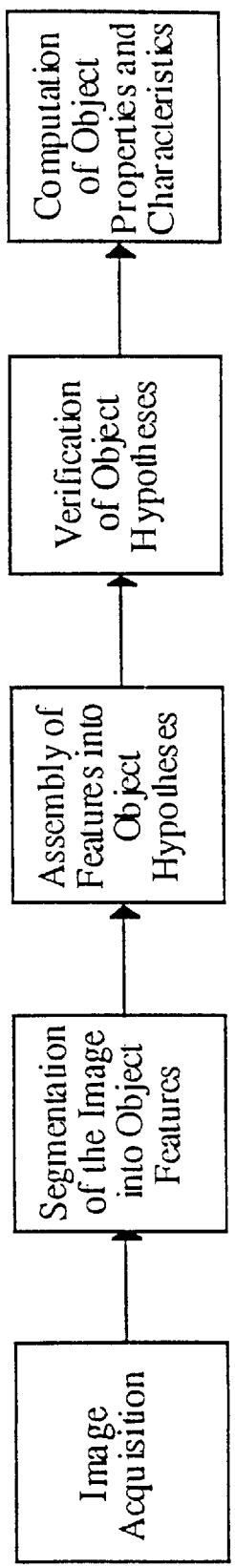
FIG. 1 is a block diagram which illustrates a conventional object recognition process pipeline.
Figure 2:
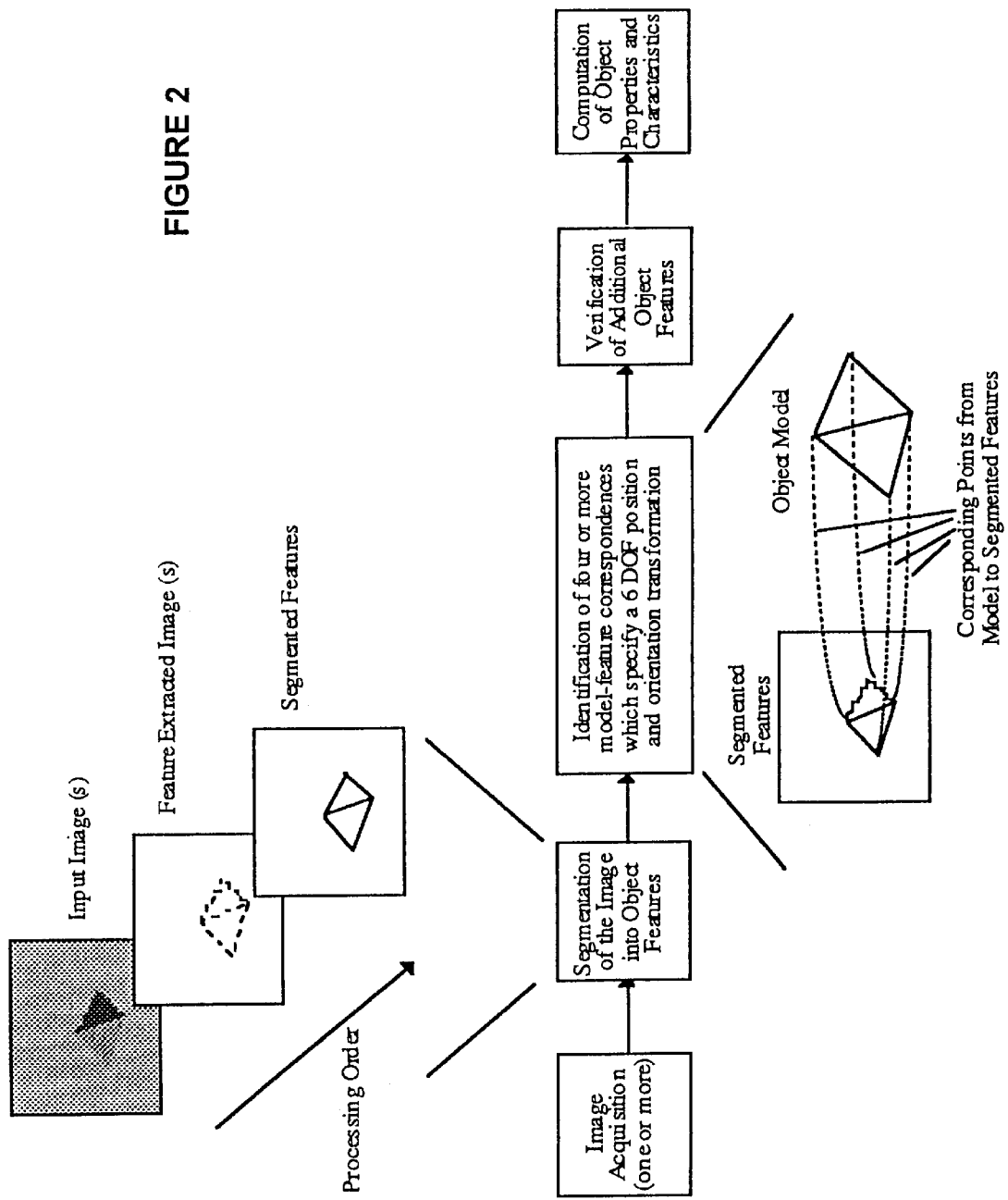
FIG. 2 is a drawing which represents a pipeline associated with the recognition of three-dimensional objects within images.
Figures 3, 5:
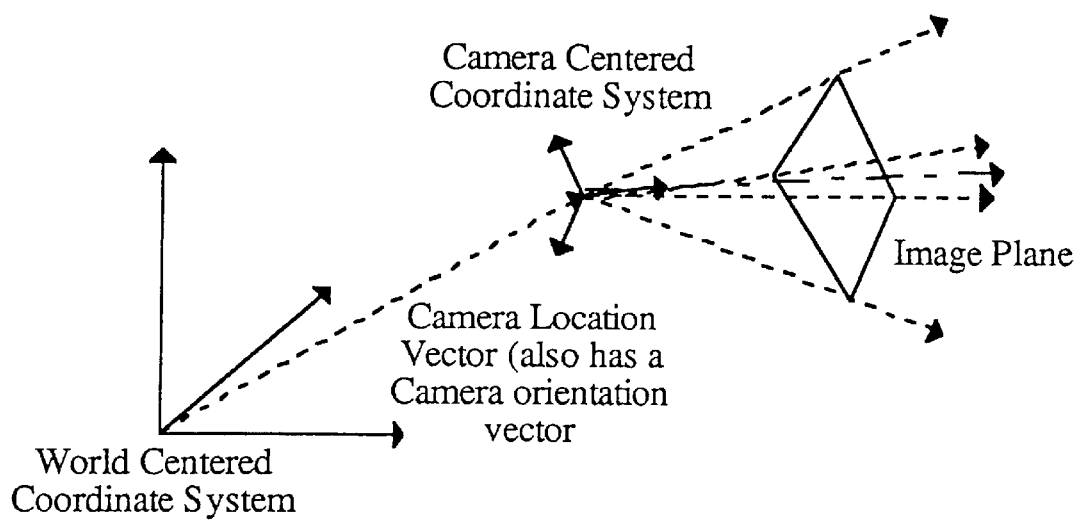
FIG. 3 is a diagram which illustrates a Sobel edge detector.
FIG. 5 illustrates the relationship between a world-centered coordinate system and a camera-centered coordinate system.
Figure 4:
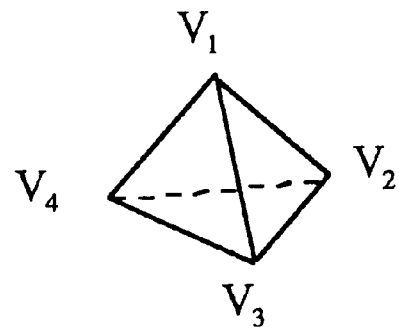
FIG. 4 represents a typical object model graphical representation.
Figure 10:
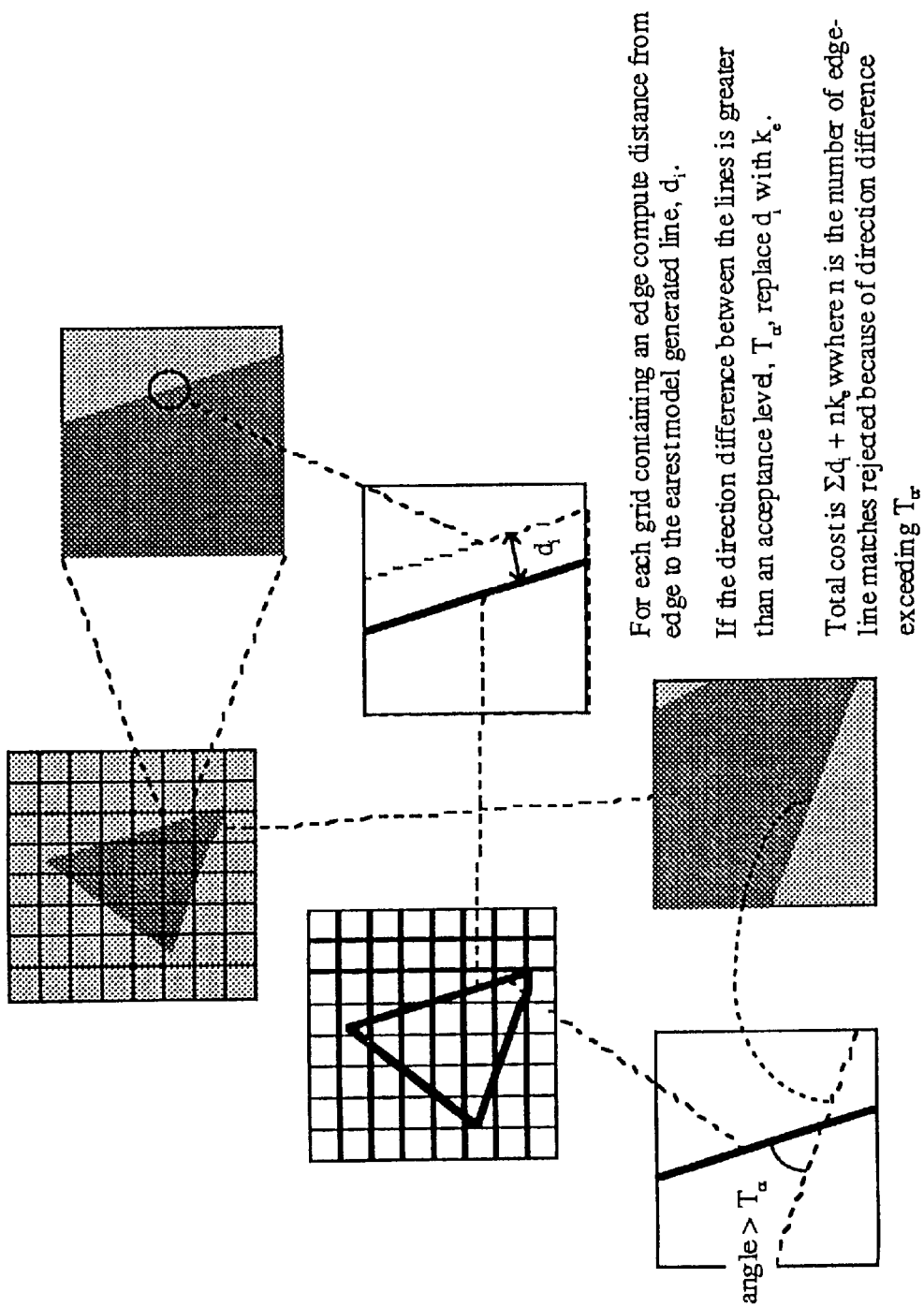
FIG. 10 is a multi-part diagram used to illustrate a matching cost metric.

The next important insight is that multi-degree of freedom (6-DOF, in particular) matched filtering can be approximated by numerical methods if the transform hypothesis taking the model to its position and orientation (pose) in an image is close to the correct transform. If this transform were known exactly, one could map a three-dimensional object model, consisting of edge elements such as those shown in the graphical object model of FIG. 4, into the image view perspective using perspective transformation and hidden-line removal. A cost function for controlling a minimum finding algorithm could then be formed by associating each edge element in a grid with the closest model line to it, and computing the sum of the distances between each edge and the model line to which it corresponds. FIG. 10 shows such a cost metric, and also indicates that if edges and model lines are not close in orientation, they contribute a positive component, $k_e$, indicating that the wrong associations may be indicated by the selection of closest model line. If the cost function were to be evaluated with perfect and complete edges (from each grid) against an object line model perfectly aligned with the image, the distance function would evaluate to zero. If all edges associate with incorrect line model elements, the distance function will evaluate to $nk_e$. $k_e$ is selected so that all partially correct bindings of edge to model line will evaluate between these two extremes and will approach zero as the fit from model to image improves.

Thus, this cost function can be used in an algorithm to solve for the pitch, roll, yaw, X, Y, Z translations which evaluate to the global minimum. This minimum marks the position and orientation of the object based on the image data if the overall cost is low enough to indicate that the correct object model has been matched. This may be judged by evaluating the cost normalized by edge length against a evidence constant of $k_f$. $k_f$ is set low enough pass a set of known correct objects matched to test images, but high enough to reject each instance where a test model is matched against an image in which it does not exist.

Figure 11:
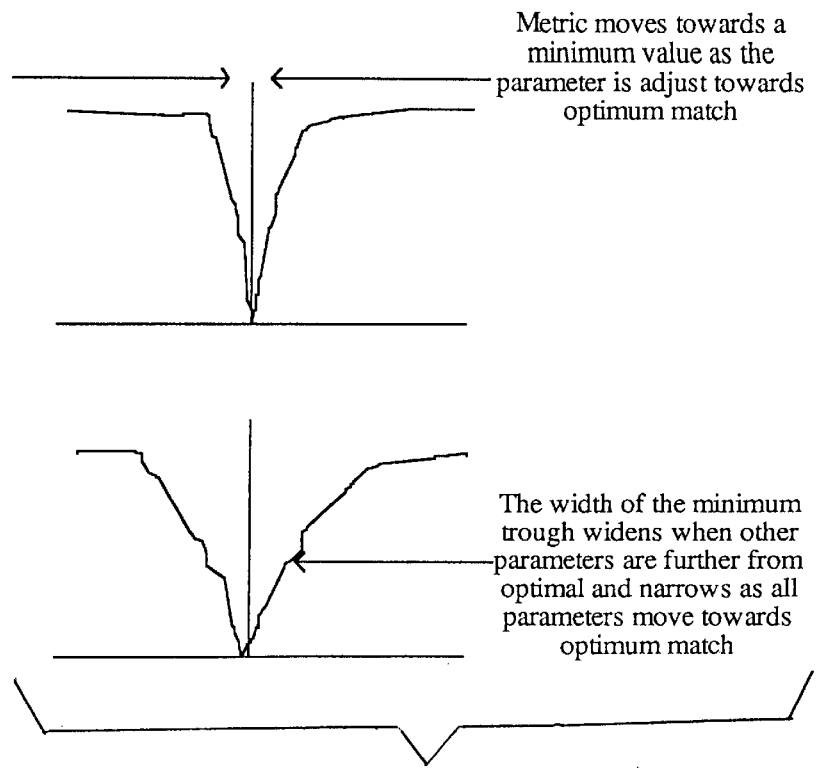
FIG. 11 illustrates how the cost metric may change as a function of parameter variation.

FIG. 11 shows the typical shape of the cost metric function as the location and orientation of the object model is varied from the nominal matching position in the parameter being shown as the independent variable, and in another parameter. As can be seen, the cost metric has a very strong minimum characteristic at or near the optimum transform value.

After evaluation, several minimum seeking methods can be used with the cost function at specific stages of matching. If the transform taking the model into the image perspective view and the edge data in the image data are very close, a bisection approach can be used to estimate the orientation/position parameters to the precision possible in the input image data set and the numerical precision of the computer. This approach evaluates the cost metric while changing a single parameter at a time (pitch, roll, yaw, X, Y, or Z) between two limits at a small step size, s. The minimum value and one of its neighbors define an interval in which the actual minimum will be found. Thus, the interval can be reduced to this smaller range (in fact, for safety we would suggest a somewhat larger interval set by the parameter $k_s$), and the step size s can be reduced proportionally as well. This process runs in round-robin fashion on each parameter (pitch, roll, yaw, X, Y, or Z) until the interval on each is less than a desired size or until the process fails to be convergent (i.e. computer round-off error begins to dominate).

The former approach allows the minimum to be found and refined when the transform is very very close. However, it is subject to errors when the initial guess for object position is further off from the correct transform value. In this case, an alternative minimum finder may be applied which evaluates the cost function at +/− $k_m$ steps along each parameter dimension (pitch, roll, yaw, X, Y, or Z). After each parameter variation is evaluated, it is checked against the most minimum value for this trial. If the new value is minimum, its location and value superseded the current minimum. Upon evaluating all variations possible within +/− $k_m$ steps from the current hypothetical object location/orientation, the algorithm jumps to the most minimum value and recurses until the same location is picked as minimum for several iterations. This local descent approach to finding the minimum value allows the initial object transform guess to be further away of the correct value than does the bisection method.

To get an initial guess which is close enough for either minimum seeking algorithm to work when an object's initial size and position/orientation is totally unknown, an alternative position and orientation hypothesis generation system is required which can create guesses that are close enough for minimum seeking system convergence. Of course, every hypothesis need not be correct, because alternative hypotheses can be competed by evaluation of the minimum seeking algorithm and comparing the fit cost metric. Incorrect hypotheses are quickly removed because of their very high cost values, while correct or near correct hypotheses will have significantly lower costs.

The approach described in this invention for initial position and orientation guess generation separates guessing the pitch, roll, and yaw from guessing X, Y, and Z (or scale). This reduces computation from $1000*1000*1000*180*180*180$, or $5 \times 10^{15}$, to $36*36*36$, or 46656, plus nominally n*m, where n is the size of the object model in line segments and m is the number of orientation guesses with confidence value greater that $k_\alpha$ (typically 50*450 or 22500).

Figure 12:
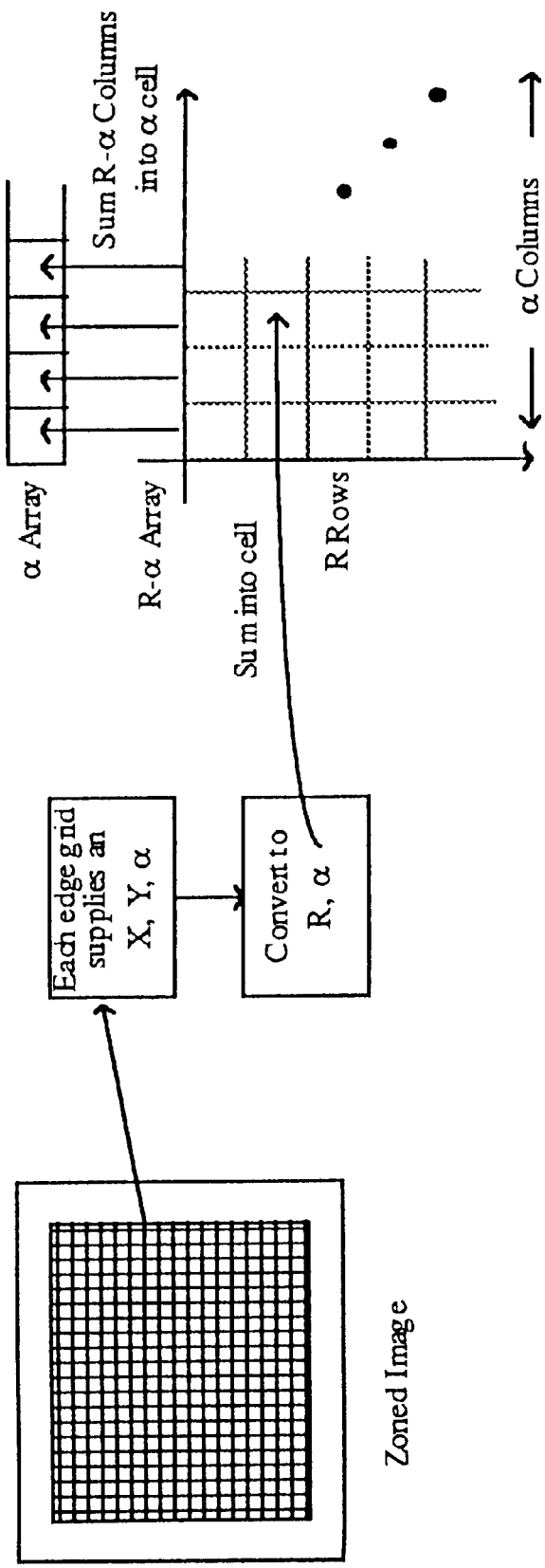
FIG. 12 illustrates the computation of an R-$\alpha$ array and $\alpha$ array itself.

First the pitch, roll, yaw angle of the object is guessed. This part of the process subdivides the image area of interest into grids as before. In each grid an edge is detected (as before) if one is present (i.e. the edge strength sum is larger than a significance threshold). The edge position and orientation is now converted to an R-α relative to the image origin (FIG. 12) and summed into a whole image R-α array. The a column of the array is summed so a single dimensional α array is formed.

For each active object model, the model is rotated about its object coordinate center in pitch, roll, and yaw over the entire angular range (nominally 360 degrees in pitch, roll, and yaw) in β degree steps (typically 10 degrees). At each orientation the model is projected with hidden-line removal and a model/orientation a array is formed by summing the angle associated with each visible line into the corresponding angle cell in the a array with a strength equal to the visible line length. Thus, each model generates sparse $(360/\beta)^3$ (or in this example, 46656) α arrays or vectors which characterize its shape from every potential viewing angle. Model α arrays computation is preferably precomputed off-line prior to the matching operation and stored in a model file.

Figure 13:
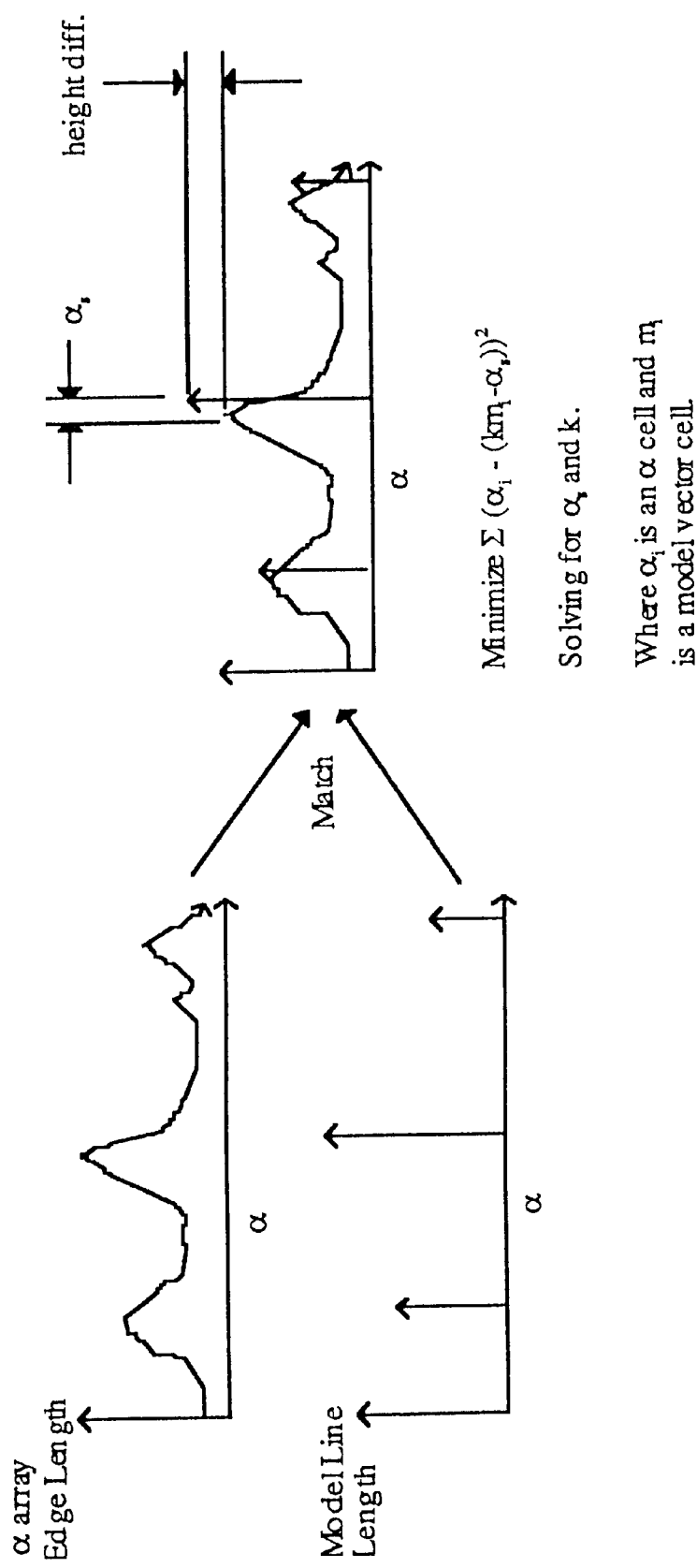
FIG. 13 illustrates how a model angle vector may be matched to an a array.

To generate a priority list of probable orientations, each model vector is matched to the single dimensional α array which was formed from the image R-α array. The match is performed using a fitting algorithm which creates a score or cost metric value which indicates the degree of fit between a particular model vector (i.e. a model and a pitch, roll, yaw orientation choice) and the image generated α array. Many possible metrics could be used, however, in this embodiment, one is employed which fits the model vector to the α array, allowing variance in shift and height (FIG. 13). The shift, $\alpha_s$, is allowed (at no cost) because the model vectors are generated in β degree steps (typically 10 degrees) and therefore will not usually match data in the α array better than +/−β/2. Also, since the magnitude of cells in the α array will be based on how large an object appears in the image, and the height of the cells in the model vector will be based on the size of the object model (both are normalized to line length per line angle, α), the preferred cost metric will be height difference neutral (while penalizing differences in height ratios).

One would also expect to see objects other than the model object in an input image, and therefore only consider matching at α cells where there is a non-zero value in the model vector (i.e. amplitude in the a cells in the image α array which do not correspond to non-zero cells in the model vector do contribute positive or negative evidence to a match).

Upon evaluating the match cost between each model vector and the image a array, generating a cost value (in the case of a least squares metric as described, a better match has a lower cost and a worst match has a high cost; some alternative metrics have this relationship flipped around), all proposed model and orientations (i.e. specific model vectors) may be sorted by the cost value to generate a list of least to most probable orientation hypotheses (when model vectors from multiple objects are mixed, these hypotheses also include specific model hypotheses as well).

Broadly, the top m % of the models/orientation hypotheses are evaluated so as to guess the appropriate X, Y, and scale (or Z). The parameter m can be set a number of ways. For instance, it can be set to put an upper limit on system computational effort, or alternatively, it can be set for complete evaluation of the full $n(360/\beta)^3$ possible hypotheses (where n is the number of object models and $(360/\beta)^3$ is the number of model orientations). The parameter m can also be set based on experimental evidence of how poorly correct orientations can score during first stage orientation screening.

Figure 14:
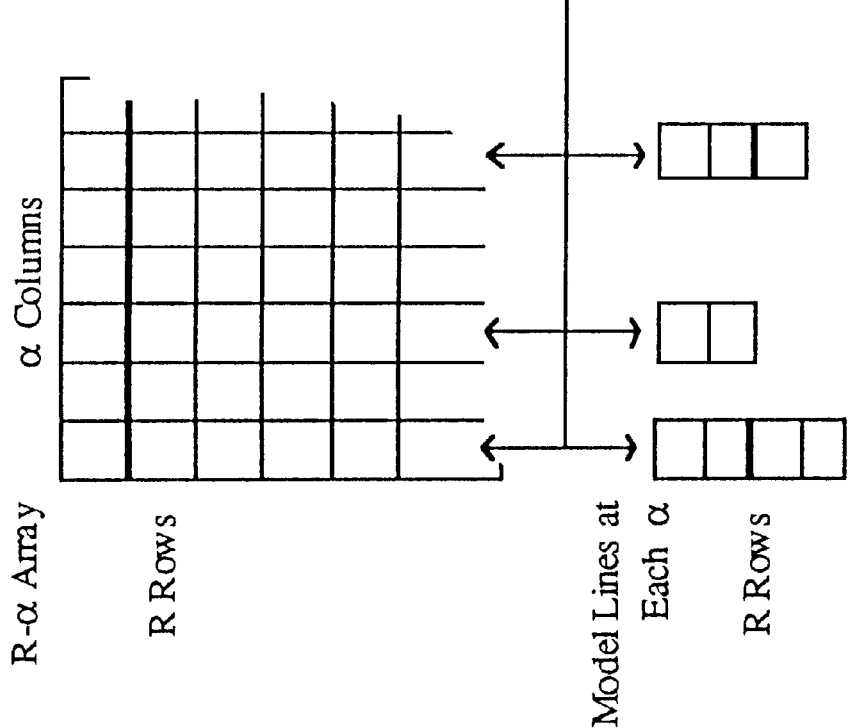
FIG. 14 shows how matching of X, Y and Z may be achieved through an R-$\alpha$ array.

The process of X, Y, Z hypothesis generation may be performed similarly to pitch, roll, yaw hypothesis generation, however, maintaining, or even precomputing, thousands of model vectors for each distinct orientation is problematic. Instead, under the control condition of a known orientation vector (pitch, roll, and yaw), one can use a highly constrained combinatorial approach. Recall how the entire image R-α array which was computed. Each cell in this array indicates the evidence (in the form of summed line length) of lines at a certain position and orientation in the image. If one could match three points, two lines, or one line and one point in a selected hidden line perspective view of a model with the correct cells in the R-α array, one would have an accurate match transform and could then evaluate a verification metric to check all object model lines against the R-α array (i.e. could form a metric as indicated in FIG. 14). Thus, all parameters, pitch, roll, yaw, and X, Y, Z would be known and a match score (which could be used to sort alternative pitch, roll, yaw, X, Y, Z hypotheses from best to worst) generated.

The approach used to accomplish the match according to this invention is shown in FIG. 14. Basically, for any hypothesized orientation (pitch, roll, yaw), it is known which columns the hidden-line perspective model lines fall into based on their angle measure in the perspective view. Thus, a combinatorial match which matches lines in the perspective view of the model against R-α cells in the column selected by the angle of the lines is required. Every time a combination of two lines, a 6 DOF transform taking the model into the image perspective is formed. Thus, through that transform, all model lines can be assigned to a R-α cell. By forming a sum of difference cost metric between model line length and edge length recorded in the R-α cell, a score can be formed for the entire model-image match at the hypothesized pitch, roll, yaw, X, Y, Z.

After evaluation of all valid combinations of model and R-α array match, the set of hypotheses can be sort from lowest value to highest value (best to worst), and fed one by one into the methods described earlier for fine orientation and position determination and validation, through evaluation of the alternative cost metrics also described herein.

Figure 16:
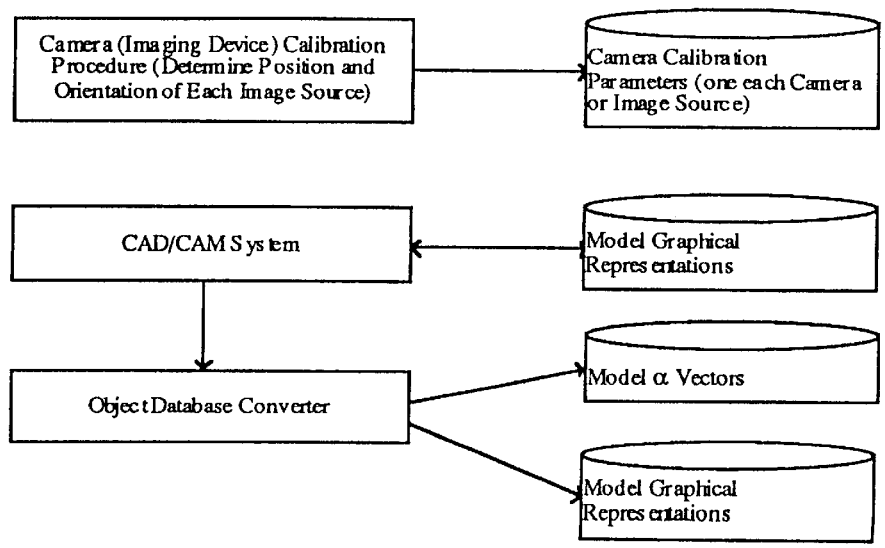
FIG. 16 illustrates certain offline functions.
Figure 15:
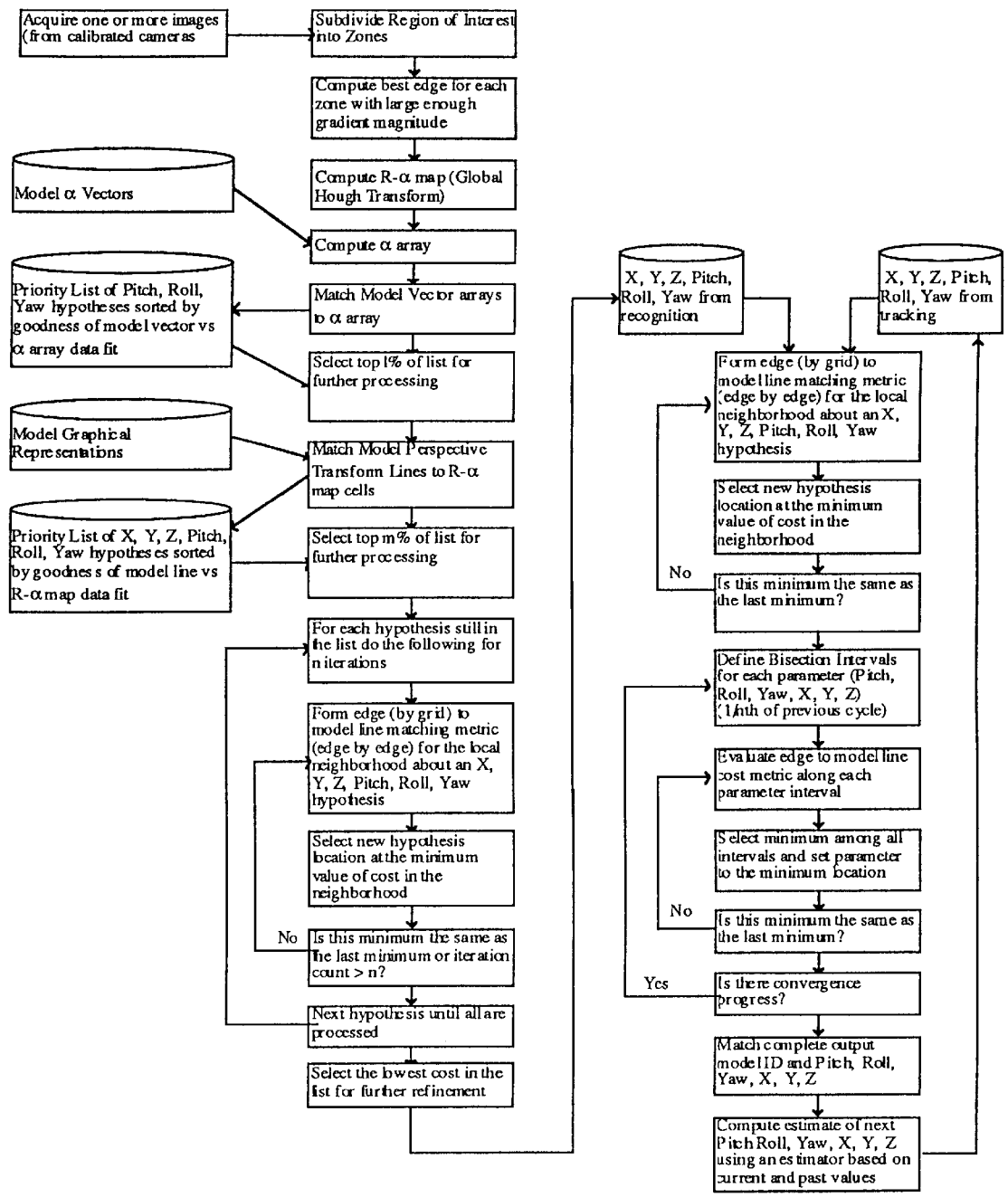
FIG. 15 illustrates a comprehensive shape matching system process flow or pipeline according to the invention.

The diagram shown in FIG. 15 helps to describe the entire matching process as outlined above. FIG. 16 shows the procedures preferably carried out off-line prior to operating the system. The process is described from the back to the front because the essence of the approach has been to 1. Assume one already knows the correct object and position/orientation match for verification;

2. Assume that one has a good guess at the correct object and position/orientation match and thus, needs to perform a minimum seeking search to fine tune a guess to perfection so as to pass it to (1); and 3. Assume that one has a set of known object models, but no idea of position and orientation, and thus needs to generate reliable, plausible hypotheses which suggest proper object model, orientation, and position for evaluation by (2).

It is also important that the order of the hypotheses generated by (3) and sent to (2) should be optimal at first, so that one can arrive at the correct answer more quickly with less computation effort.

The invention can be combined with other image processing techniques to allow characterization of the object by color or texture, by recognizing that once an object outline is matched to an image, the interior of the bounded regions can be processed as a coherent surface. For instance, one can extract a small patch of pixels from the interior of a bounded area which has been associated with a model surface, transform that sample into a surface coordinate system normalized form, and compare the sample to known colors or texture maps.

Also, recall that the processes suggested in FIG. 15 rely on cost metrics which can be formed across multiple input images by simply summing cost functions. Thus, assuming camera models (i.e., the geometric parameters which control image formation for the camera—these include camera center position and orientation) are known, the method can assimilate information from single or multiple camera views. A practical consideration when it is desirable to obtain accurate object position information is to supply views where the specific position/orientation degrees of freedom of the object match well to the X, Y sampling of the camera array.

In applications where objects move from image frame to image frame, as in video, a great efficiency can be obtained by applying the unknown object-unknown position/orientation process only to areas where new objects are known to appear. This could be at image borders, or in the case of edited video sequences, just after fade-ins. After all objects of interest have been identified and located, object tracking can be obtained readily by using the known object-good guess of position/orientation. Variants of the approach which account for probable object motion between images in a video sequence have also been developed which use a 6 DOF (or less) estimator for predicting next object position/orientation based on past object positions/orientations (FIG. 15). Tracking cuts down computational effort substantially.

Figure 17:
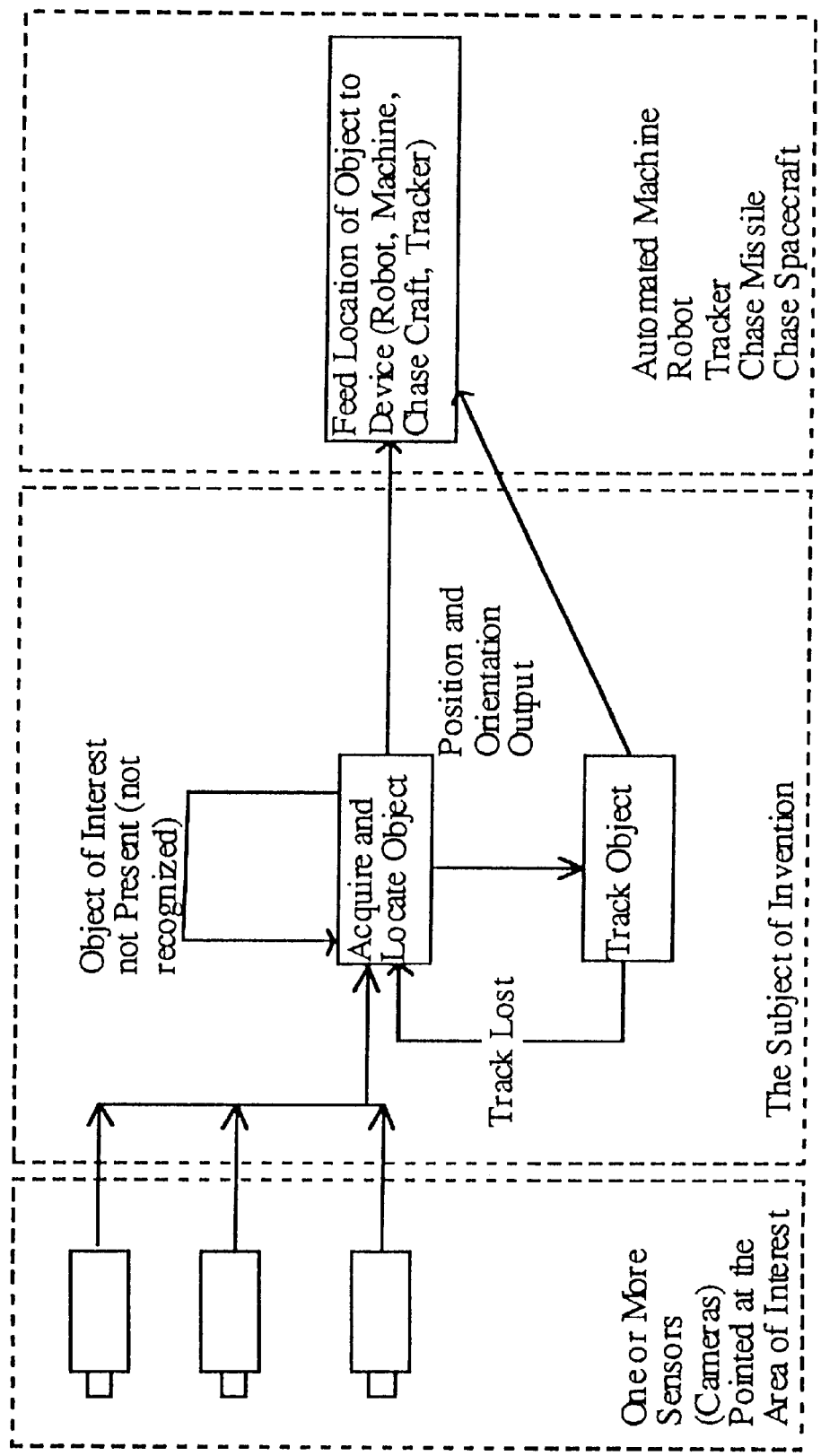
FIG. 17 is a diagram which shows one way in which the invention may be applied to robot or aircraft/spacecraft tracking.

The methods suggested here find application in robot and machine control for identifying objects as specific part types, acquiring input object locations and orientation, and tracking during specific manipulation operations. FIG. 17 shows a typical arrangement for machine control, and how this invention may be incorporated into the system. Other applications reside in aircraft, missile, or spacecraft identification, acquisition of position/orientation, and tracking. The principle difference is camera array size and position, and, potentially, imaging sensor operation physics (virtually all factory applications will use vidicons or charge coupled cameras, whereas tracking and docking applications may use active devices like RADAR or LADAR, laser radar, or devices which operate at alternative frequency bands like infrared).

Less obvious, but equally important, are applications which are involved with management and manipulation of image data, video sequences in particular. All image stills and sequences are beginning to be stored in digital form. It is often useful to be able to find a particular image within an image library or within a long video sequence for reuse of re-editing. Unfortunately, unless a person has specifically keyed a symbolic descriptor to the specific image(s), they are difficult to find given current technology.

Currently available technology supports query into image databases based on whole image metrics (i.e. metrics which can be evaluated on the entire image). These include evaluating for image colors, textures, large scale structure (for instance compositions which have large blue areas at the top of the image and ground at the bottom), and cross correlation-type matches to particular query images or image patches. However, the most natural method for a user to describe the desired image is for him/her to specify the types of object which should appear in the desired image. This requires an image matching method which can recognize specific objects and combinations of objects in the scene. Since most objects of interest are three dimensional, the matching method must accommodate object perspective transformations. Also, since most scenes are "cluttered" or have objects and forms besides the ones of interest, the matching method must find the desired objects, without being fooled of confused by extraneous object data.

Figure 18:
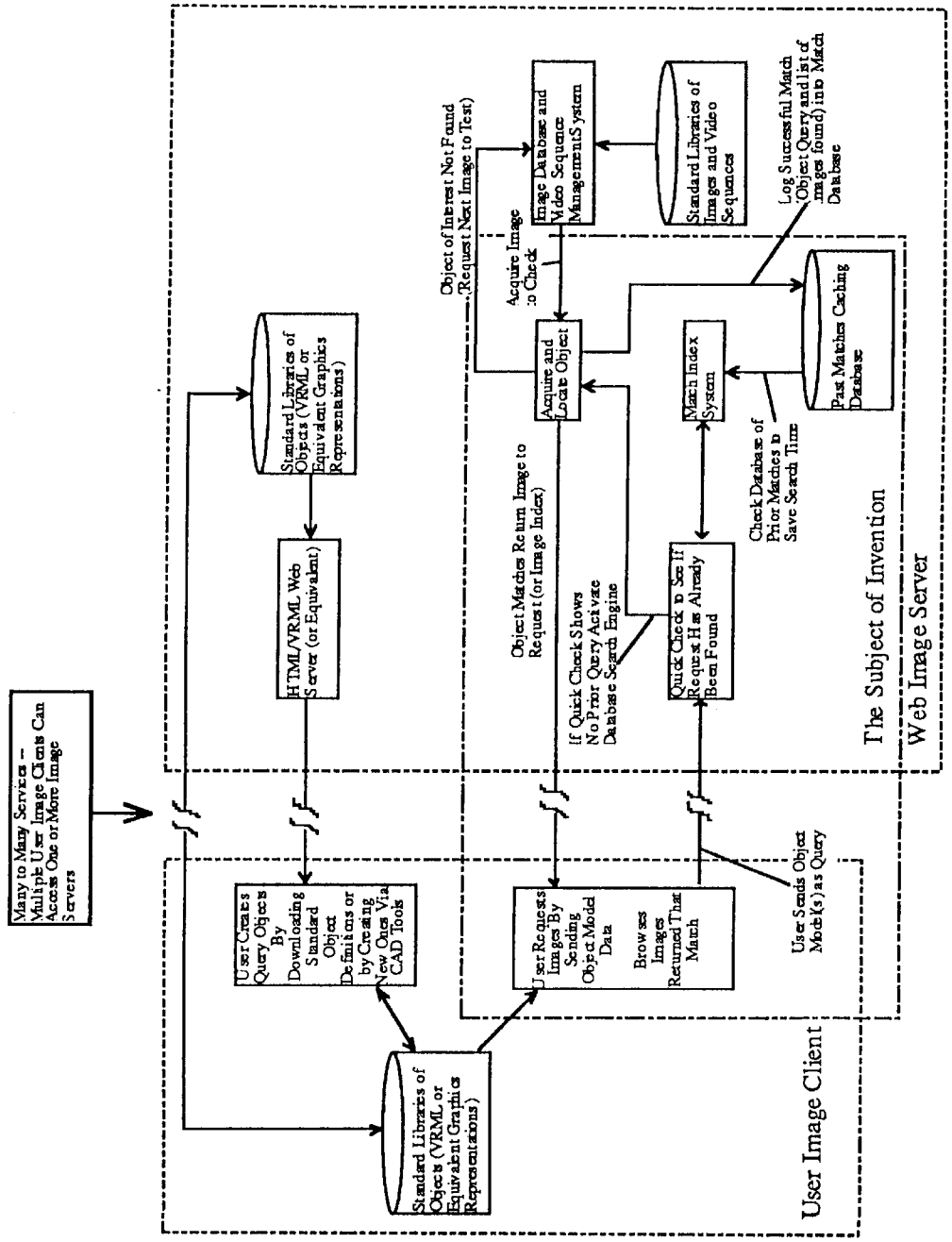
FIG. 18 represents a distributed image database query.

FIG. 18 shows how this invention may be applied to a distributed image database storage and retrieval system (and also includes where existing methods of retrieval fit into the system). The system is shown as distributed, because even with the computation complexity reduction entailed in the invention, effort needed to match large libraries of image data require division of labor between multiple computer systems.

Important elements include the user's request process, which incorporates a method for image viewing or browsing, a method for generation of new object models (typically a CAD or drawing system), and a method for databasing object databases, which can be select at query keys to remote or local image libraries. Key elements of the image database server include a method for storing images or sequences (typically a compute file system coupled to a database indexing system), a computational engine which accepts matching requests, computes probable matches, and sends results back to the user terminal (for instance, through HTML compliant files—alternative formats a methods can be used also, but HTML compliance makes the data viewable on Internet browsers), and a method for keeping prior matches around to minimize the effort to rematch when a match is found. To reuse old matches, back distribution of object models should occur so that remote users can share common query models as much as possible.

We claim:

1. A method of recognizing three-dimensional objects through parameter zoning, comprising the steps of:
   a) receiving data characterizing a three-dimensional object;
   b) performing a transformation on the data to generate a projected image of at least a portion of the object;
   c) subdividing the projected image into a zoned image containing a single object feature event describable in terms of X, Y, Z estimation space and pitch, roll, yaw angle space;
   d) receiving a digitized scene from one or more sensors;
   e) selecting an area of interest from the scene;
   f) subdividing the area of interest into a zoned area of interest by:
      zoning the initial pitch, roll, yaw angle space into a predetermined number of angular steps, and
      zoning the initial X, Y, Z estimation space using angular subdivisions;
   g) comparing the zoned image to the zoned area of interest; and
   h) repeating steps b), c), d) and g) to determine if the portion of the object is contained within the zoned area of interest.

2. The method of claim 1, further including the step of: repeating the zoning of the X, Y. Z and pitch, roll, yaw spaces using fixed and reducing step sizes.

3. The method of claim 1, further including the step of tuning parameters associated with the X, Y, Z and pitch, roll, yaw spaces so as to optimize the spaces one parameter dimension at a time.

4. A method of recognizing three-dimensional objects through parameter zoning, comprising the steps of:
   a) receiving data characterizing a three-dimensional object;
   b) performing a transformation on the data to generate a projected image of at least a portion of the object by:
      i. determining an initial guess as to pitch, roll, yaw,
      ii. determining an initial guess as to X, Y, and Z by exploiting the constraints from the pitch, roll, yaw estimates,
      iii. determining an initial X, Y, Z, pitch, roll, yaw refinement based on a fixed step size minimum seeking algorithm,
      iv. refining the final optimum X, Y, Z, pitch, roll, yaw from the fixed step size algorithm with a variable step size algorithm, and
      v. using the current and past X, Y, Z, pitch, roll, yaw values to predict the next X, Y, Z, pitch, roll, yaw value followed by refinement through steps iii and iv;
   c) subdividing the projected image into a zoned image;
   d) receiving a digitized scene from one or more sensors;
   e) selecting an area of interest from the scene;
   f) subdividing the area of interest into a zoned area of interest;
   g) comparing the zoned image to the zoned area of interest; and
   h) repeating steps b), c), d) and g) to determine if the portion of the object is contained within the zoned area of interest.

5. A method of recognizing an object in an input image, comprising the steps of:
   a) receiving data representative of a three-dimensional object;
   b) performing a numerical transformation on the data to generate a projected image of at least a portion of the object by:
      i. approximating a multi-degree of freedom matched filter using numerical methods,
      ii. using a cost function to solve for translations with respect to each degree of freedom to evaluate to the global minimum, and
      iii. using a minimum seeking method with the cost function at specific stages of matching,
   c) subdividing the projected image into a zoned image of the object;
   d) receiving an input image from one or more sensors;
   e) determining a region of interest within the input image;
   f) partitioning the region of interest into a plurality of multiple pixel grids, each grid covering an object signature with a plurality of distinct zones;
   g) analyzing each zone to determine the following:
      1) the presence or absence of a primitive feature, and, if present,
      2) the location and orientation of the primitive feature;
   h) transforming the location and orientation of the primitive feature into a two-dimensional R-$\alpha$ array;
   i) scanning the R-$\alpha$ array for a maximum value;
   j) comparing the value to a significance threshold;
   k) if the maximum value is greater than a significance threshold, assuming the grid includes a primitive feature at the R-$\alpha$ location;
   l) comparing the grid to the zoned image of the object to determine if the portion of the object is contained within the grid.

6. A method of recognizing an object in an input image, comprising the steps of:
   a) receiving data representative of a three-dimensional object;
   b) performing a numerical transformation on the data to generate a projected image of at least a portion of the object;
   c) subdividing the projected image into a zoned image of the object;
   d) receiving an input image from one or more sensors;
   e) determining a region of interest within the input image;
   f) partitioning the region of interest into a plurality of multiple pixel grids, each grid covering an object signature with a plurality of distinct zones;
   g) analyzing each zone to determine the following:
      1) the presence or absence of a primitive feature, and, if present,
      2) the location and orientation of the primitive feature;
   h) transforming the location and orientation of the primitive feature into a two-dimensional R-$\alpha$ array using a Sobel operator to evaluate each pixel within the grid, resulting in an edge strength, L, a location, $X_p$, $Y_p$, and a direction angle, $\alpha$;
   converting the location ($X_p$, $Y_p$) and the angle $\alpha$ into an R and an $\alpha$ according to the relation, $(Y-Y_p)/(X-X_p)=\tan \alpha \rightarrow R=X \sin \alpha + Y \cos \alpha$ using $X \sin \alpha$ and $Y \cos \alpha$ as indices into a two-dimensional R-α array to select a cell into which the edge strength, L, is summed;

i) scanning the R-α array for a maximum value;

j) comparing the value to a significance threshold;

k) if the maximum value is greater than a significance threshold, assuming the grid includes a primitive feature at the R-α location;

l) comparing the grid to the zoned image of the object to determine if the portion of the object is contained within the grid.

7. A method of recognizing an object in an input image, comprising the steps of:

a) receiving data representative of a three-dimensional object;

b) performing a numerical transformation on the data to generate a projected image of at least a portion of the object;

c) subdividing the projected image into a zoned image of the object;

d) receiving an input image from one or more sensors;

e) determining a region of interest within the input image;

f) partitioning the region of interest into a plurality of multiple pixel grids, each grid covering an object signature with a plurality of distinct zones;

g) analyzing each zone to determine the following:
        1) the presence or absence of a primitive feature, and, if present,
        2) the location and orientation of the primitive feature;

h) transforming the location and orientation of the primitive feature into a two-dimensional R-α array;

i) scanning the R-α array for a maximum value utilizing a bisection approach which evaluates the cost metric while changing a single parameter at a time between two limits at a small step size, s, the parameters including pitch, roll, yaw, X, Y and Z, and applying the previous step in round-robin fashion with respect to pitch, roll, yaw, X, Y, or Z until the interval on each is less than a desired size, or until the process fails to be convergent j) comparing the value to a significance threshold;

k) if the maximum value is greater than a significance threshold, assuming the grid includes a primitive feature at the R-α location;

l) comparing the grid to the zoned image of the object to determine if the portion of the object is contained within the grid.

8. A method of recognizing an object in an input image, comprising the steps of:

a) receiving data representative of a three-dimensional object;

b) performing a numerical transformation on the data to generate a projected image of at least a portion of the object;

c) subdividing the projected image into a zoned image of the object;

d) receiving an input image from one or more sensors;

e) determining a region of interest within the input image;

f) partitioning the region of interest into a plurality of multiple pixel grids, each grid covering an object signature with a plurality of distinct zones;

g) analyzing each zone to determine the following:
        1) the presence or absence of a primitive feature, and, if present,
        2) the location and orientation of the primitive feature;

h) transforming the location and orientation of the primitive feature into a two-dimensional R-α array;

i) scanning the R-α array for a maximum value using a descent approach which includes the following steps:
        i. evaluating the cost function at $+/-k_m$ steps along one or more parameter dimensions, including pitch, roll, yaw, X, Y, or Z;
        ii. checking each parameter against the most minimum value for this trial;
        iii. if the new value is minimum, its location and value superseded the current minimum; and
        iv. after evaluating all variations possible within $+/-k_m$ steps from the current hypothetical object location/orientation, jumping to the most minimum value and recursing until the same location is picked as minimum for several iterations;

j) comparing the value to a significance threshold;

k) if the maximum value is greater than a significance threshold, assuming the grid includes a primitive feature at the R-α location;

l) comparing the grid to the zoned image of the object to determine if the portion of the object is contained within the grid.

* * * * *

UNITED STATES PATENT AND TRADEMARK OFFICE
CERTIFICATE OF CORRECTION

PATENT NO. : 6,173,066 B1 Page 1 of 1
APPLICATION NO. : 08/861411
DATED : January 9, 2001
INVENTOR(S) : Peurach et al.

It is certified that error appears in the above-identified patent and that said Letters Patent is hereby corrected as shown below:

Column 1, line 10, insert:

—GOVERNMENT SUPPORT
This invention was made with Government support under Contract No. F08637-94-C6030 awarded by the United States Air Force. The Government has certain rights in the invention.--

Signed and Sealed this

Twenty-fourth Day of November, 2009

David J. Kappos
*Director of the United States Patent and Trademark Office*